United States Patent
Tran et al.

(10) Patent No.: US 10,116,226 B2
(45) Date of Patent: Oct. 30, 2018

(54) MULTI-PHASE ELECTRIC DRIVE AND METHOD THEREFOR TO PROVIDE POWER TO A POWER UNIT

(71) Applicant: ABB Schweiz AG, Baden (CH)

(72) Inventors: Quyen Tran, Muenchenstein (CH); Andreas Voegeli, Doettingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/174,333

(22) Filed: Jun. 6, 2016

(65) Prior Publication Data

US 2016/0359424 A1 Dec. 8, 2016

Related U.S. Application Data

(63) Continuation of application No. PCT/EP2014/059569, filed on May 9, 2014.

(30) Foreign Application Priority Data

Dec. 25, 2013 (CN) .......................... 2013 1 0727132

(51) Int. Cl.
*H02M 5/458* (2006.01)
*H02P 29/02* (2016.01)
(Continued)

(52) U.S. Cl.
CPC .......... *H02M 5/458* (2013.01); *H02H 1/0092* (2013.01); *H02H 3/162* (2013.01);
(Continued)

(58) Field of Classification Search
CPC .......... H02M 5/458; H02M 1/12; H02M 1/32; H02M 7/49; H02M 2001/0077
See application file for complete search history.

(56) References Cited

U.S. PATENT DOCUMENTS

| 5,625,545 A | 4/1997 | Hammond |
| 6,313,600 B1 | 11/2001 | Hammond et al. |

(Continued)

FOREIGN PATENT DOCUMENTS

| CN | 2792014 Y | 6/2006 |
| CN | 1949645 A | 4/2007 |

(Continued)

OTHER PUBLICATIONS

European Patent Office, International Search Report & Written Opinion issued in correspnding Application No. PCT/EP2014/059569, dated Feb. 26, 2015, 10 pp.

(Continued)

*Primary Examiner* — Jue Zhang
*Assistant Examiner* — Lakaisha Jackson
(74) *Attorney, Agent, or Firm* — J. Bruce Schelkopf; Taft Stettinius & Hollister LLP

(57) ABSTRACT

A multi-phase electric drive includes a multi-phase power transformer, including a primary winding and a first number of secondary windings, said primary winding being electrically connectable to a source of multi-phase AC power; a first number of power units, each of said first number of power units having input connected with a corresponding one of said first number of secondary windings, and a multiple of said first number of power units being serially connected with respective others of said power units in each phase output line connectable to a multi-phase AC load; at least one measurement device, being electrically connected with said input to at least one of said first number of power units and being adapted for measuring an electrical quantity at the input thereto; and a control system, being adapted for detecting a fault based on a value for the measured electrical quantity.

22 Claims, 17 Drawing Sheets

(51) Int. Cl.

| | |
|---|---|
| *H02M 1/32* | (2007.01) |
| *H02M 7/49* | (2007.01) |
| *H02H 7/12* | (2006.01) |
| *H02H 1/00* | (2006.01) |
| *H02H 3/16* | (2006.01) |
| *H02M 1/12* | (2006.01) |
| *H02M 1/00* | (2006.01) |
| *H02H 9/00* | (2006.01) |

(52) U.S. Cl.
CPC .......... *H02H 7/1216* (2013.01); *H02M 1/12* (2013.01); *H02M 1/32* (2013.01); *H02M 7/49* (2013.01); *H02P 29/02* (2013.01); *H02H 9/001* (2013.01); *H02M 2001/0077* (2013.01)

(56) References Cited

U.S. PATENT DOCUMENTS

| | | | | |
|---|---|---|---|---|
| 7,940,537 | B2* | 5/2011 | Abolhassani | H02M 7/49 363/37 |
| 2007/0055902 | A1 | 3/2007 | Bousfield, III et al. | |
| 2010/0060186 | A1* | 3/2010 | Taipale | H05B 41/2822 315/291 |
| 2011/0057444 | A1 | 3/2011 | Dai et al. | |
| 2012/0033472 | A1* | 2/2012 | Oka | H02P 13/00 363/127 |
| 2012/0127673 | A1* | 5/2012 | Ledezma | H02M 7/003 361/730 |

FOREIGN PATENT DOCUMENTS

| | | |
|---|---|---|
| CN | 200987070 Y | 12/2007 |
| CN | 201331555 Y | 10/2009 |
| CN | 201724988 U | 1/2011 |
| CN | 202084909 U | 12/2011 |
| DE | 3236692 A1 | 4/1983 |
| EP | 1322028 A2 | 6/2003 |
| EP | 2093871 A1 | 8/2009 |
| JP | H06209583 A | 7/1994 |
| JP | 2003174778 A | 6/2003 |
| JP | 2004088974 A | 3/2004 |
| JP | 2004104959 A | 4/2004 |
| JP | 2008228415 A | 9/2006 |
| KR | 9106505 B1 | 8/1991 |
| KR | 100753610 B1 | 8/2007 |
| WO | 20090655999 A1 | 5/2009 |

OTHER PUBLICATIONS

First Office Action, Chinese Patent Application No. 201310727132.X, dated Jul. 31, 2017, 41 pages, English Translation Provided.

* cited by examiner

MULTI-PHASE ELECTRIC DRIVE AND METHOD THEREFOR TO PROVIDE POWER TO A POWER UNIT

TECHNICAL FIELD

The invention relates to the field of a multi-phase electric drive, and more particularly to cascaded multi-phase electric drive and its method.

BACKGROUND ART

Cascaded multi-phase electric drives are used in industry to provide variable electric power to AC motors. These same drives can be used in other applications not related to specifically to motors but where a variable-output voltage or frequency is desired. Typical drives have an AC input power source and some type of conversion apparatus, usually using solid-state devices, for converting the fixed AC input voltage into a variable-voltage and/or variable-frequency output. One such type of drive is described in U.S. Pat. No. 5,625,545, which is incorporated herein by reference. That patent describes a power supply used as a drive which utilizes a number of power cells (power units) arranged to produce a three-phase AC output. Such multiple power units in series can be utilized to provide higher voltage outputs than would be available with only a single power unit.

In a conventional cascaded multi-phase drive, electric power fed from the grid flows to the load through the primary windings, the secondary windings, and the cascaded power units. Usually fuses are assembled on the power units. Where there is a fault at the secondary side of the drive, for example short circuit current leading through a path including a secondary winding, fuses and power units, the fuses get blown first and the short circuit current path is opened and thus the other components in the path are protected; however, if there is a short circuit between phases of a secondary winding and the short circuit loop does not include the fuse, then it will not be opened until at least one phase of the secondary winding is broken to open circuit; in other words, the transformer cannot be protected. Besides, where there is a fault at the primary side of the drive, its control system identifies a fault on its components by measuring its DC-link voltages of the power units or primary transformer currents; however, this hardly works where the load is light or no load; in addition, if there is a low voltage ride through at the grid side, it will take some time when such fault is reflected on change of the DC-link voltage of a power unit, and thus its identification is delayed.

BRIEF SUMMARY OF THE INVENTION

It is therefore an objective of the invention to provide a multi-phase drive and the method therefor that can detect of a fault without using a fuse.

According to an embodiment of the invention, it is proposed a multi-phase electric drive, including: a multi-phase power transformer, including at least one primary winding and a first number of secondary windings, said primary winding being electrically connectable to a source of multi-phase AC power; a first number of power units, each of said first number of power units having input connected with a corresponding one of said first number of secondary windings, and a multiple of said first number of power units being serially connected with respective others of said power units in each phase output line connectable to a multi-phase AC load; at least one measurement device, being electrically connected with said input to at least one of said first number of power units and being adapted for measuring an electrical quantity at the input thereto; and a control system, being adapted for detecting a fault based on a value for the measured electrical quantity.

According to another aspect of present invention, it is proposed a method for operating the multi-phase electric drive, including steps of:
(a) transforming an input voltage to a plurality of secondary voltage sources;
(b) feeding power from said plurality of secondary voltage sources to each phase of a load from a multiple of said first number of power units being serially connected with respective others of said power units in each phase output line;
(c) measuring an electrical quantity at input of at least one of said first number of power units; and
(d) detecting a fault based on value for the measured electrical quantity.

As regards the secondary side fault which is concerned with, for example, a short circuit or an open circuit in the secondary windings of the transformer, in the cables electrically connecting the transformer and the power unit, inside the rectifier of the power unit, in the capacitor of the power unit, in the charging resistor and relay, or in the inverter of the power unit, and so on, even if the AC load is light, there will be (i) a difference between the electrical quantities measured at the inputs of the healthy one and the faulty one of the power units, or (ii) there will be a difference between the electrical quantity measured at the input to the faulty power unit and a predetermined value. With respective of scenario (i), such difference may be evaluated by a difference between the electrical quantity measured at the input to the faulty power unit and an average of the electrical quantities measured at inputs to the relevant power units, including the healthy one and the faulty one. As regards the primary side fault which is concerned with, for example, a short circuit of the primary winding, an open circuit of the primary winding, a grid fault and so on, there will be differences respectively between the value for the electrical quantity measured at the input of the respective one of the power units and a predetermined value.

It is to be understood that fuses assembled on the power units are not necessary for protection of a secondary side fault. In addition, a secondary side fault due to a short circuit/open circuit of the secondary windings or an open circuit/short circuit of the rectifier of the power unit can be detected and thus protecting the drive from further damage; finally, they are helpful for detecting and protecting a secondary side fault with the power units where the AC load is light. the primary side defect can be detected faster than using the measurement on the DC-link of a power unit, so that an appropriate reaction, such as ride through mode can be activated more quickly.

Further embodiments, aspect, and details are evident from the detailed description, the figures, and the dependent claims.

BRIEF DESCRIPTION OF THE DRAWINGS

Embodiments and examples of the invention are illustrated in the figures and will be explained in more detail in the following figures.

PREFERRED EMBODIMENTS OF THE INVENTION

Figure 1:
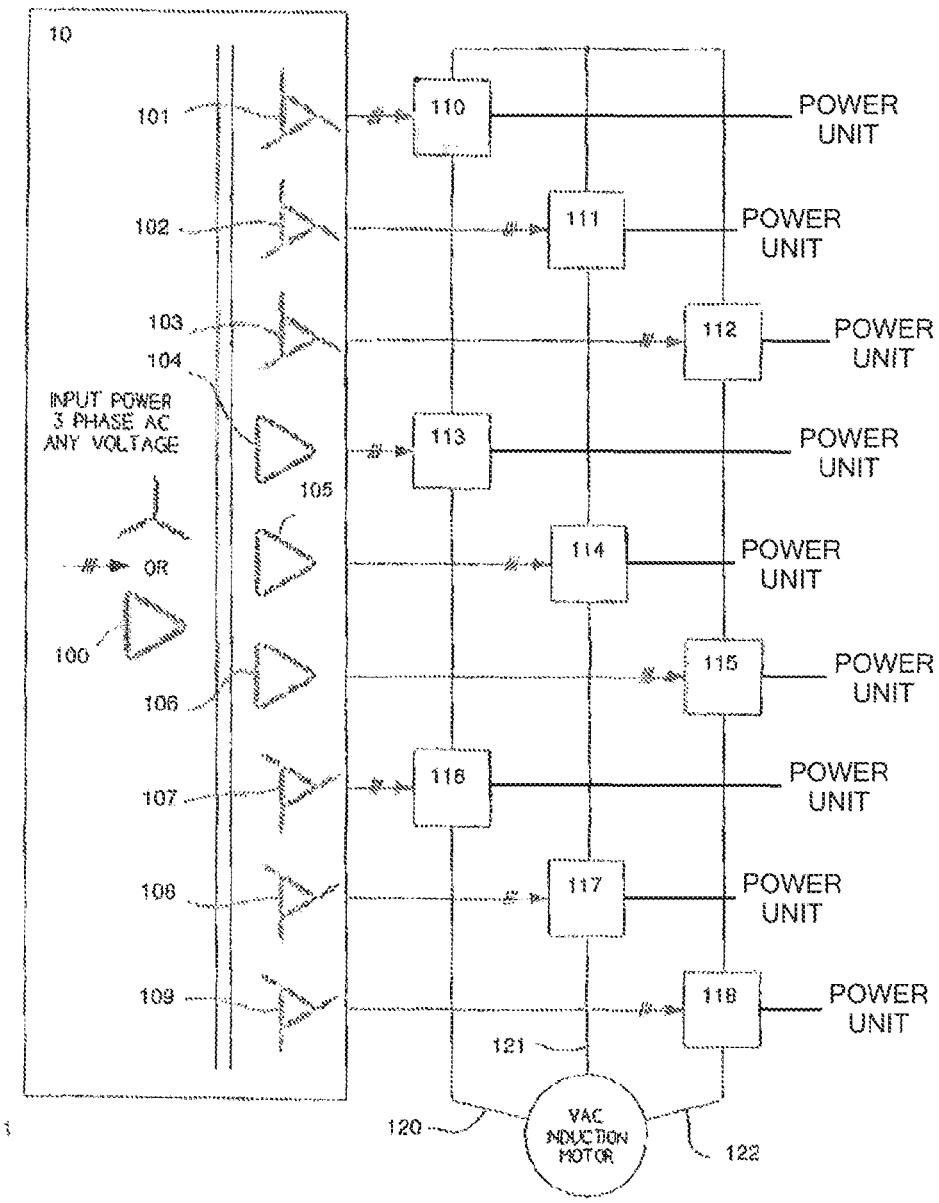
FIG. 1 shows a power circuit diagram for a cascaded multi-phase drive having three power units in each phase.

The subject matter of the invention will be explained in more detail in the following text with reference to preferred exemplary embodiments which are illustrated in the drawings, in which:

FIG. 1 shows a power circuit diagram for a cascaded multi-phase drive having three power units in each phase. As shown in FIG. 1, three-phase AC power is inputted to primary winding 100 of power supply transformer 10 of a cascaded multi-phase drive 1. Primary winding 100, which may be star- or mesh-connected, energizes three-phase secondary windings 101 through 109. The three-phase power associated with each of secondary windings 101 through 109 can be supplied to power units 110 through 118, respectively. In this present embodiment it is preferred to provide mesh-connected secondary windings 101 through 109 to lower the supply transformer's K-factor and to improve harmonics control. Mesh-connected winding may include, for example, delta or extended delta configurations. Under certain circumstances, such mesh windings may be manipulated to advance some of the secondary windings by preselected degrees of electrical phase, to retard other secondary windings by preselected degrees of electrical phase, and, perhaps, to leave other secondary windings substantially un-shifted in phase. In the present embodiment shown in FIG. 1, it is described that one-third of the secondary windings be advanced in phase by 20 (degree) and that one-third of the secondary windings be delayed in phase by 20 (degree). The remaining third of the secondary windings remain un-shifted. In the embodiment of FIG. 1, the phase-shifted windings use extended-delta-configured windings, and the un-shifted windings use delta-configured windings. For other voltages, the respective phase shift needed can be obtained by dividing 60 (degree) by the number of power units per phase. For example, with 5 power units per phase, the shifts are +24 (degree), +12 (degree), 0 (degree), −12 (degree) and −24 (degree); with 6 power units per phase, the shifts are +25 (degree), +15 (degree), +5 (degree), −5 (degree), −15 (degree) and −25 (degree); with 8 power units per phase, the shifts are +26.25, +18.75 (degree), +11.25 (degree), +3.75 (degree), −3.75 (degree), −11.25 (degree) and −18.75 and −26.25 (degree); with 9 power units per phase, the shifts are −26.67 (degree), −20 (degree), −13.33 (degree), −6.67 (degree), 0 (degree), +6.67 (degree), +13.33 (degree), +20 (degree), +26.67 (degree). It is preferred to connect multiple power units to each of phase output lines 120, 121, 122, which can represent phase A, Phase B and Phase C, respectively. Multiple power units can be connected in series on each phase output line, making it possible to produce a medium-voltage input phase line controller with a plurality of low-voltage power units. Serial connections also make multiple voltage states per phase possible; these multiple voltage states per phase may be used to obtain improved current waveforms. Each power unit may be constructed internally to low-voltage standards, for example, each power unit may have a 1000-volts rating, despite its inclusion in a medium-voltage apparatus.

Figure 2A:
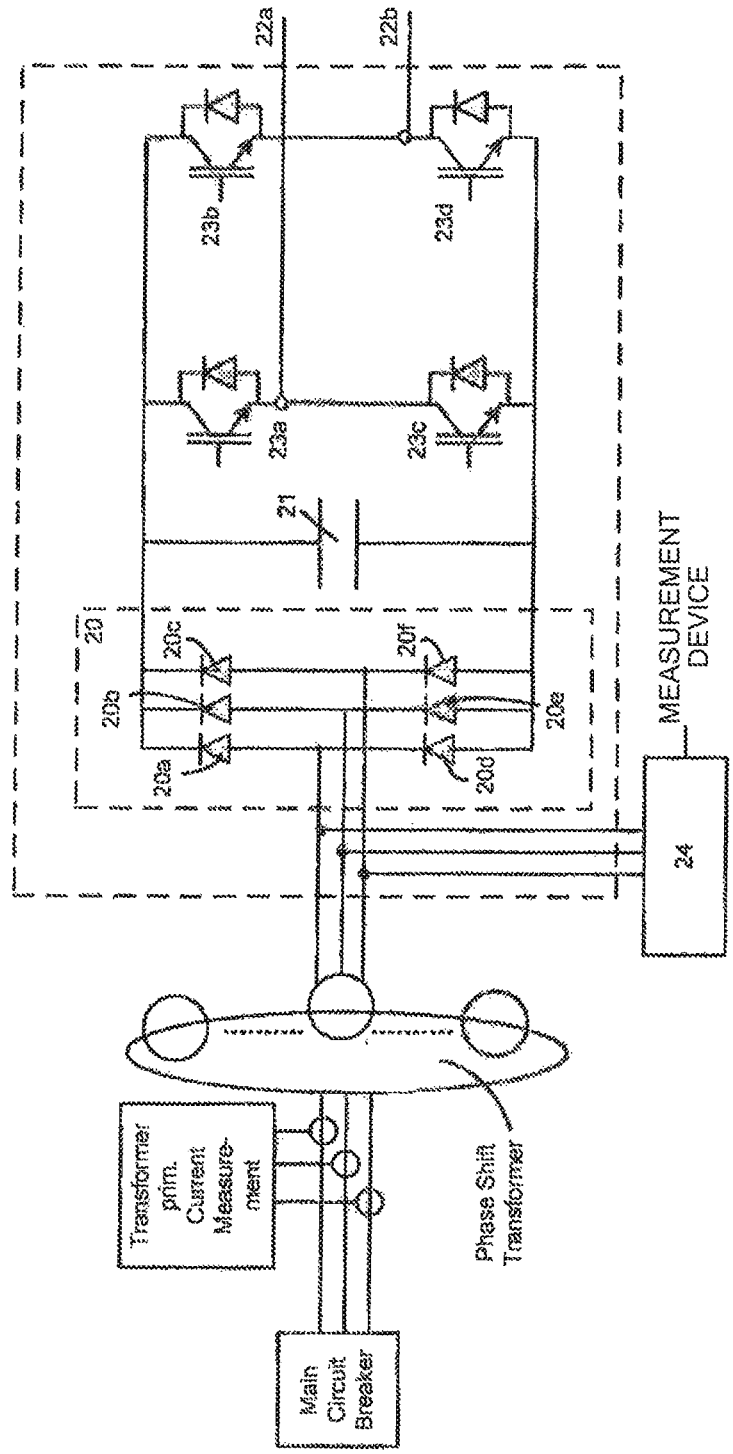
FIG. 2A shows a typical power unit as used in FIG. 1.

FIG. 2A shows a typical power unit as used in FIG. 1. However, it is to be understood that other power units can be utilized in practicing this invention. The power unit shown in FIG. 2A is similar to that shown in U.S. Pat. No. 5,625,545. As show in FIG. 2A, each of power units 110 through 118 is a power converter which converts the three-phase incoming power into a DC component through utilization of a rectifier 20 composed of diodes 20a-20f. The output of this rectifier is then directed across capacitor 21. The DC voltage in the capacitor 21 can be selectively applied to the power unit outputs 22a and 22b using a pulse-width modulated (PWM) method. The pulse-width modulation may be implemented using a bridge converter which is composed of semiconductor switches such as 23a-23d. Any type of acceptable switch element can be used; and depending on the power level, various solid-state components may be chosen. As shown, the converter output utilizes four IGBTs. In such a pulse-width modulated operation the switches can be considered either fully on or fully off as they operate. As will be understood in most applications, it is desirable that the power units utilized in a cascaded arrangement be similar and constructed in a form so as to limit the number of subassemblies and permit power units to be interchangeable within the same drive. Power unit as shown in FIG. 2A could be utilized for all of the power units 110 through 118 in FIG. 1. As shown in FIG. 2A, a measurement device 24 is provided for measuring electrical quantity respectively at inputs to power units 110 through 118. The measured electrical quantity can be voltage, or current in consideration of the correlation between a voltage and a current, and accordingly the measurement device 24 can include current detector or voltage detector. For example, the current detector may be implemented using hall sensor, and the voltage detector may be implemented using voltage divider. A control system (not shown in FIG. 2A) can detect a fault based on the value for the measured electrical quantity which will be described in detail as below. As will be understood in most applications, it is helpful for having the measurement devices 24 respectively for all of the power units 110 through 118 so that the fault detection can be made in consideration of the values for the measured electrical quantities involving all of the power units; however, the fault detection will still work if one or more of the power units 110 through 118 are respectively equipped with the measurement devices 24 if what was concerned is the potential faults on them.

Figure 2B:
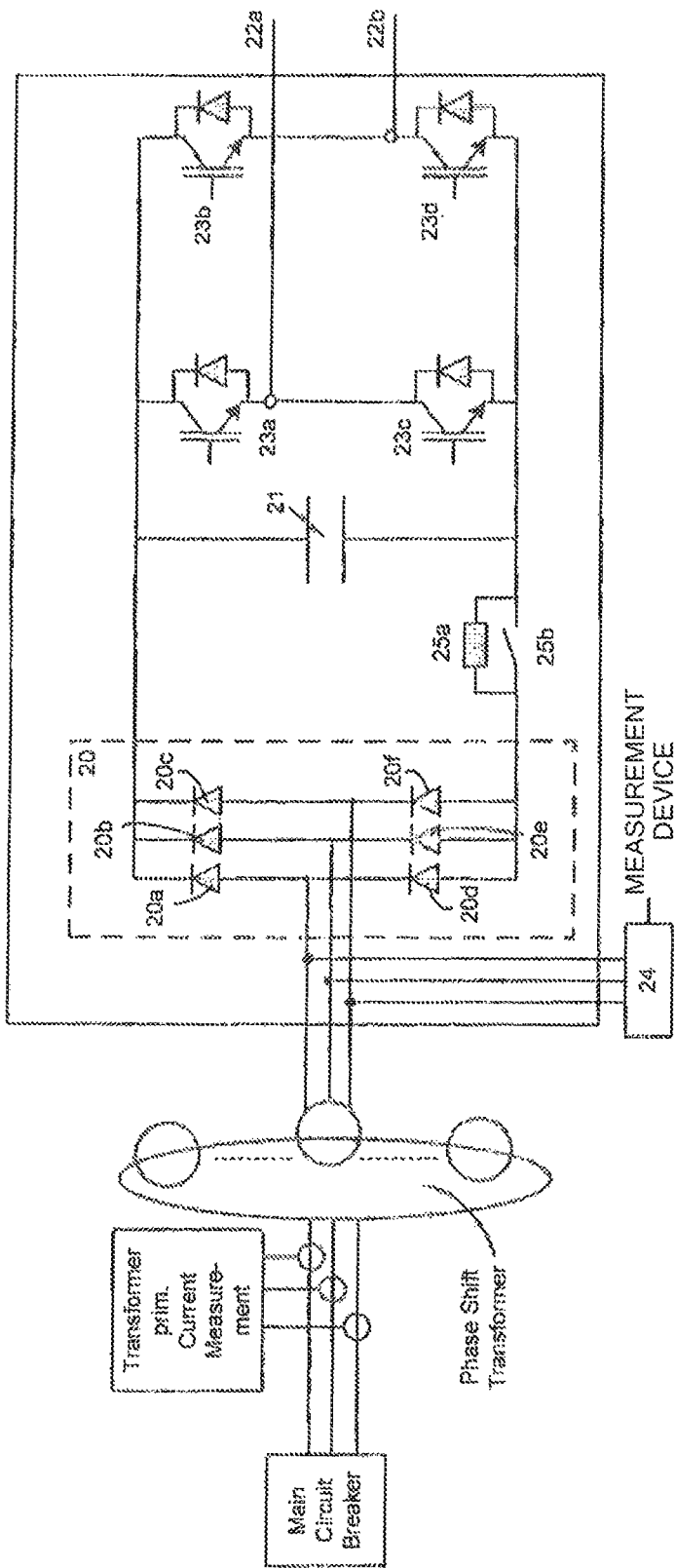
FIG. 2B shows an alternative to the power unit according to FIG. 2A.

FIG. 2B shows an alternative to the power unit according to FIG. 2A. As shown in FIG. 2B as compared with FIG. 2A, a charging resistor 25a and a charging switch 25b are further provided between the rectifier 20 and the capacitor 21, where the charging resistor 25a and the charging switch 25b are connected in parallel. The charging switch 25b can be a relay. By having the charging resistor 25a and the charging switch 25b, when the drive is powered up, the charging switch 25b is open and the start-up current flows through the charging resistor 25a and thus the current is restricted to a certain level because of the resistance of the charging resistor 25a; when the power-up is finished, the charging switch 25b is closed and the current bypasses the charging resistor 25a.

Figure 2C:
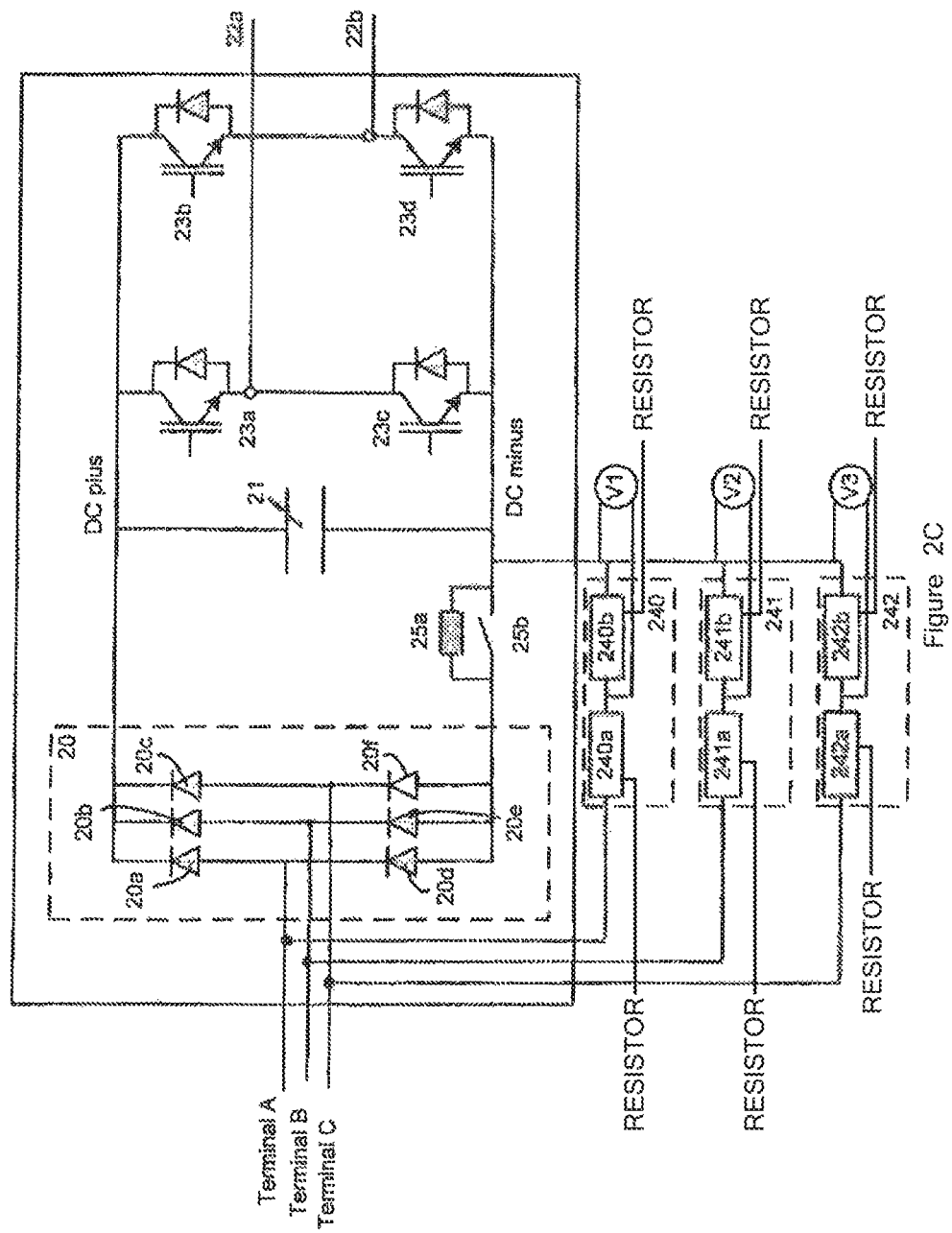
FIGS. 2C to 2D show embodiments of the measurement device according to FIGS. 2A and 2B.
Figure 2D:
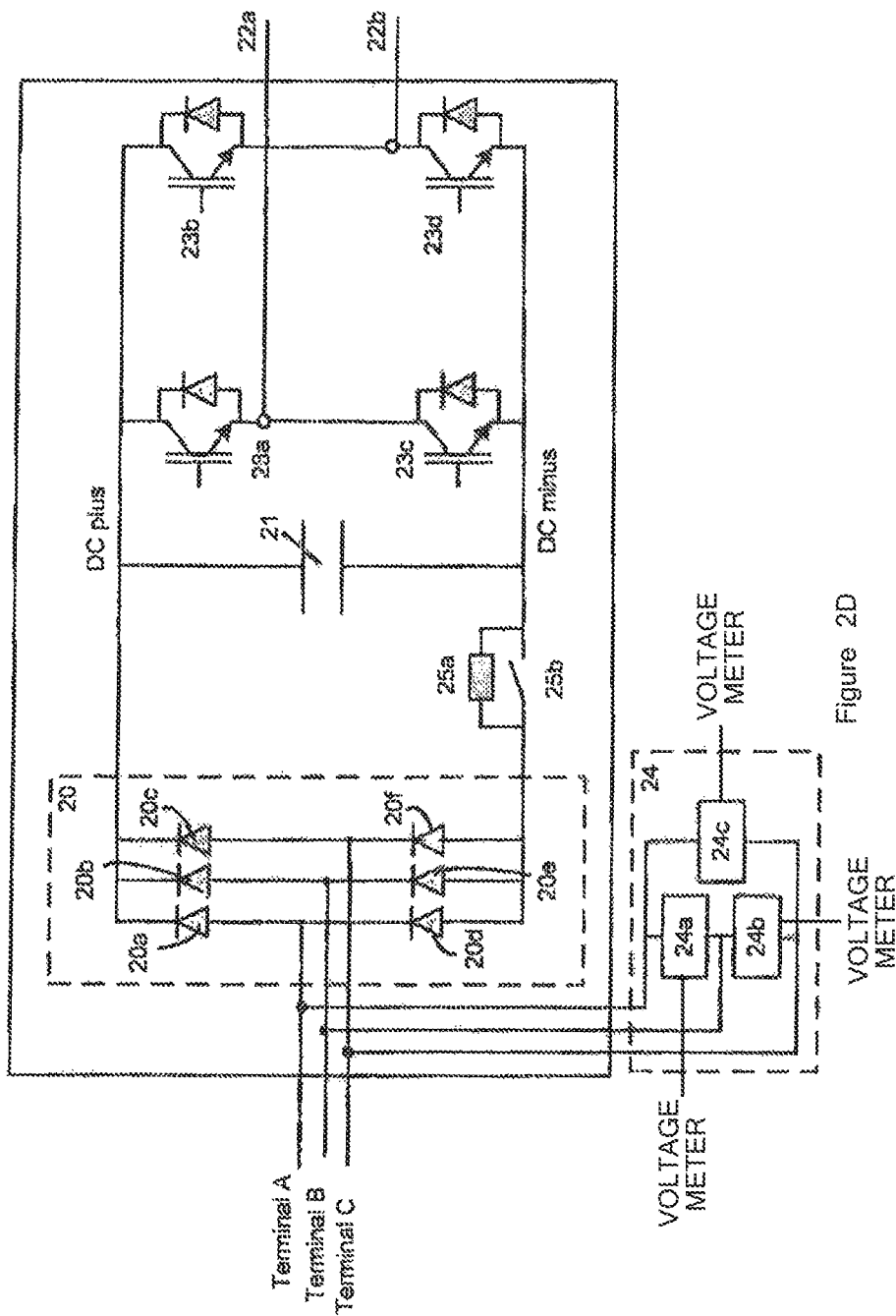

FIGS. 2C to 2D show embodiments of the measurement device according to FIGS. 2A and 2B.

As shown in FIG. 2C, the measurement device includes three voltage dividers 240, 241, 242 for measuring a level of voltage as the electrical quantity. Each of the voltage dividers 240, 241, 242 includes two resistors in series. For example, the voltage divider 240 includes resistors 240a, 240b connected in series, the voltage divider 241 includes resistors 241a, 241b connected in series, and the voltage divider 242 includes resistors 242a, 242b connected in series. The voltage divider 240, 241, 242 is a linear circuit that can produce an output voltage that is a fraction of its input voltage which is to be measured; in particular, the input voltage for the voltage divider 240 is a phase voltage V1 input at input terminal A of the power unit as regards to the level of DC minus of the power unit, the input voltage for the voltage divider 241 is a phase voltage V2 input at input terminal B of the power unit as regards the level of DC minus of the power unit, and the input voltage for the voltage divider 242 is a phase voltage V3 input at input terminal C of the power unit as regards the level of DC minus of the power unit. It is commonly used to create a reference voltage, or to get a low voltage signal proportional to the voltage to be measured, and the common potential of the power unit, for example, the DC minus, is taken as the reference voltage, and it is to be understood that any common potential, such as the DC plus of the power unit, can be taken as the reference voltage. By having the voltage divider, a fraction of the phase voltage input to the power unit as regards to the DC minus of the power unit is detected and can be converted by utilizing an ADC to signal representing the measured phase voltage for the control system's processing, including calculating phase-to-phase voltage or filtering in terms of a certain period based on the measured phase voltages. It is to be understood that the measurement device can include one voltage divider for measuring one of the phase voltages input to the power unit, or two voltage dividers respectively for measuring two of the phase voltages input to the power unit.

As an alternative shown in FIG. 2D, the measurement device 24 includes three voltage meters 24a, 24b, 24c which are arranged across two of the three input terminals of the power unit for measuring the levels of the phase-to-phase voltages as input to the power unit. The signal for the values for the measured phase-to-phase voltages are sent to the control system for further processing. It is to be understood that the measurement device can include one voltage sensor for measuring one of the phase-to-phase voltages input to the power unit, or two voltage sensors respectively for measuring two of the phase-to-phase voltages input to the power unit.

Figure 3:
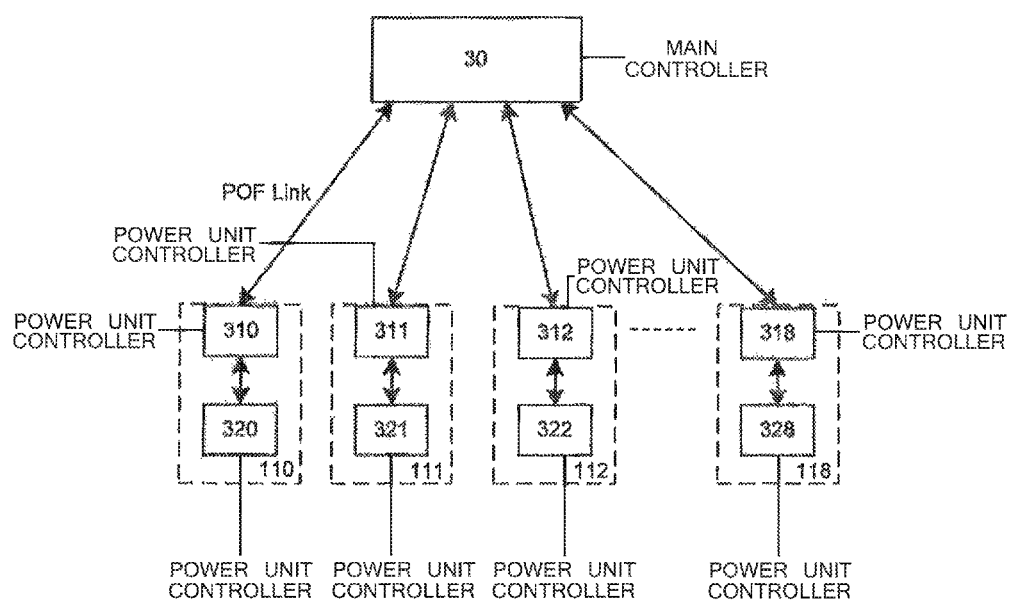
FIG. 3 shows control system which is utilized to control the operation of the cascaded multi-phase electric drive according to an embodiment of present invention.

FIG. 3 shows control system which is utilized to control the operation of the cascaded multi-phase electric drive according to an embodiment of present invention. As shown in FIG. 3, the control system 3 may include a main controller 30 and a multiple of power unit controllers 310 through 318. The power units 110 through 118 are similar to that shown in any of FIGS. 2A through 2B. As shown in FIG. 3, the power units 110 through 118 respectively have the measurement device 320 through 328 for measuring electrical quantities respectively at the inputs thereto.

As regards the secondary side fault which is concerned with, for example, a short circuit or an open circuit in the secondary windings of the transformer, in the cables electrically connecting the transformer and the power unit, inside the rectifier of the power unit, in the capacitor of the power unit, in the charging resistor and relay, or in the inverter of the power unit, and so on, even if the AC load is light, there will be (i) a difference between the electrical quantities measured at the inputs of the healthy one and the faulty one of the power units, or (ii) there will be a difference between the electrical quantity measured at the input to the faulty power unit and a predetermined value. With respective of scenario (i), such difference may be evaluated by a difference between the electrical quantity measured at the input to the faulty power unit and an average of the electrical quantities measured at inputs to the relevant power units, including the healthy one and the faulty one. As regards the primary side fault which is concerned with, for example, a short circuit of the primary winding, an open circuit of the primary winding, a grid fault and so on, there will be differences respectively between the value for the electrical quantity measured at the input of the respective one of the power units and a predetermined value.

In present embodiment of FIG. 3 as solution to secondary side fault scenario (i), in instances where a power unit controller 310 through 318 is contained in the individual power unit subassembly, signals to that subassembly may be generated from the main controller 30, and the main controller 30 also receives from the subassembly signals individually generated by the power unit controller 310 through 318. As shown in FIG. 3, the measurement device 320 through 328 sends the value for the measured electrical quantities to the respective one of the power unit controllers 310 through 318, and the respective one of the power unit controllers 310 through 318 stores the value for measured electrical quantity in its memory and forwards the value for measured electrical quantities to the main controller 30. The main controller 30 receives the respective value for measured electrical quantities and calculates an average thereof and sends the average to each of the power unit controllers 310 through 318. Each of the power unit controllers 310 through 318 receives the average and detects the secondary side fault based on a difference between the value for measured electrical quantity stored in its memory and the average. It is to be understood that the number of the measurement devices is not restricted to be equal to the number of the power units; the detection of the secondary side fault can be done with measuring the inputs to some of the power units by adopting the detection means focusing on those, and the detection of secondary side fault may be identified among them if any. As an alternative, the calculation of the difference can be done at the main controller 30, and the signals for the values for the measured electrical quantities are sent from the power unit controller 310 through 318 to the main controller 30.

As an alternative with solution of secondary side fault scenario (ii) and primary side fault, each of the power unit controllers 310 through 318 records a predetermined value as threshold set by an operator. The measurement device 320 through 328 sends the values for the measured electrical quantities to the respective one of the power unit controllers 310 through 318, and the respective one of the power unit controllers 310 through 318 stores the value for the measured electrical quantity in its memory. The power unit controller 310 through 318 calculates a cyclic average of the electrical quantity involving respective one of the power units 110 through 118 during a predetermined period. The respective one of the power unit controllers 310 through 318 calculates the difference between the cyclic average and the predetermined threshold and detects a fault based on the difference. The respective one of the power unit controllers 310 through 318 sends a fault signal as detected to the main controller 30 and the main controller 30 detects a secondary side fault where fault signals are received from some of the power unit controllers 310 through 318; as alternative, if fault signals are received from all of the power unit controllers 310 through 318, it is detected as the primary side fault. It is to be understood that the number of the measurement devices is not restricted to be equal to the number of the power units; the detection of the secondary side fault can be done with measuring the inputs to some of the power units by adopting the detection means focusing on those, and the detection of secondary side fault may be identified among them if any. As an alternative, the calculation of the difference can be done at the main controller 30, and the signals for the values for the measured electrical quantities are sent from the power unit controller 310 through 318 to the main controller 30, and the predetermined value as threshold is set in the main controller 30 by an operator.

As seen from the above, some of the above functions of the power unit controller can be integrated into the main controller such that the operation of calculation and comparison is centralized in the main controller.

Figure 4A:
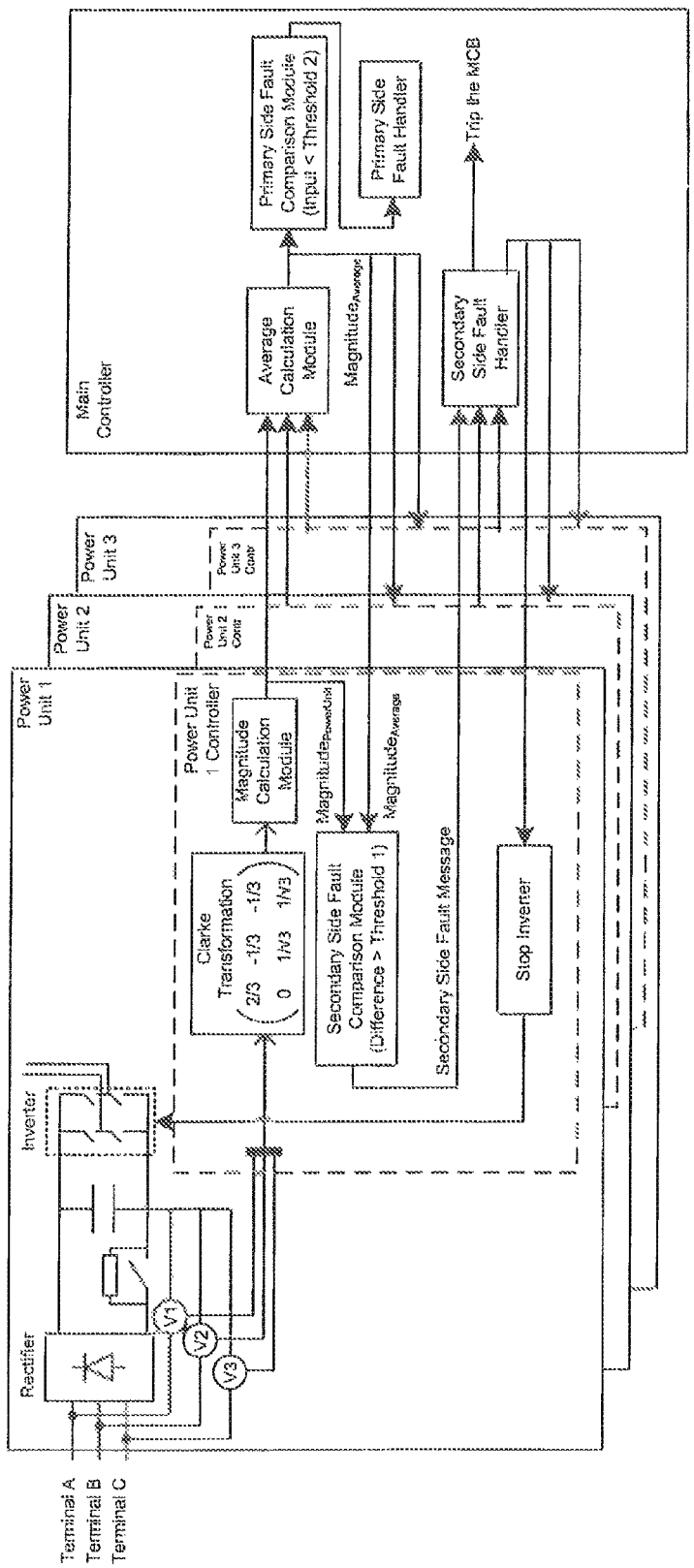
FIG. 4A shows a block diagram for the primary and secondary side fault detection method according to an embodiment of present invention.

FIG. 4A shows a block diagram for the primary and secondary side fault detection method according to an embodiment of present invention. It is to be understood that the method according to FIG. 4A is used for three power units as an example for explanation, and the method is applicable to any number of multiple power units, for example two power units, five power units, six power units, eight power units, nine power units and so on. The block diagram of power unit 1, power unit 2 and power unit 3 are the same in functionality, thus only that for power unit 1 is shown in detail and will be described thereafter. As shown in FIG. 4A, each of power unit 1, power unit 2, and power unit 3 has an electrical measurement device for measuring phase voltages at inputs of the respective one of power unit 1, power unit 2, and power unit 3, V1, V2, and V3. The power unit 1 controller is located in the power unit 1, and can receive the values for the measured phase voltages and process them by Clarke transformation module to get the vector sum of the phase-to-phase voltage vectors among which are separated by a predetermined vector angle, for example 120 degrees, and a value for the magnitude of the vector sum output from the Clarke transformation module can be provided by magnitude calculation module. Power unit 2 and power unit 3 can take the same process and configuration as power unit 1 does, therefore, the main controller can receive three signals representing the respective magnitude of the vector sum of the measured phase-to-phase voltages respectively from power unit 1 controller, power unit 2 controller, and power unit 3 controller. The main controller can calculate an average of the received three magnitude values involving power unit 1, power unit 2, and power unit 3 by its calculation module and feed back to the respective one of power unit 1, power unit 2, and power unit 3. The secondary side fault comparison module of the power unit 1 controller can compare the magnitude value of the vector sum as provided by the magnitude calculation module of power unit 1 controller and the average Magnitude_Average received from the main controller, and detect a secondary side fault based on such difference. Power unit 2 controller and power unit 3 controller also can do so. If the level of the difference exceeds beyond a Threshold 1, being 20-30% of the rated secondary voltage of the transformer, then the secondary side fault comparison module can judge, if there is a secondary side fault and accordingly send a secondary side fault signal to the secondary side fault handler of the main controller which can initiate a trip signal to switch off the main circuit breaker (MCB) to turn off the power supply to the drive and/or provide a secondary side fault signal to a stop inverter module of the power unit controller, which can initiate a stop command to stop the operation of the inverter of the power unit.

Below is a sample of source code for the method above:

```
// Power Unit Controller
Ualpha   = (V1 * 2.0 - (V2 + V3))/3;
Ubeta    = (V2 - V3) * 1 / sqrt(3);
magnitude = sqrt(Ualpha^2+ Ubeta^2);
if (abs(Magnitude_PowerUnit - Magnitude_Average) > Threshold)
    send(PowerUnit_Input_Failure);
end
// Main1 Controller
Magnitude_Average = (Magnitude_PowerUnit1 +
Magnitude_PowerUnit2 + Magnitude_PowerUnit3)/3.
```

The Magnitude_Average calculated by the average calculation module can also be sent to the primary side fault comparison module, which can detect a primary side fault based on this Magnitude_Average. If the level of this Magnitude_Average exceeds below Threshold 2, being 70-90% of the rated secondary voltage of the transformer, then the primary side fault comparison module can judge, that there is a primary side fault and accordingly send a primary side fault signal to the primary side fault handler of the main controller.

Figure 4B:
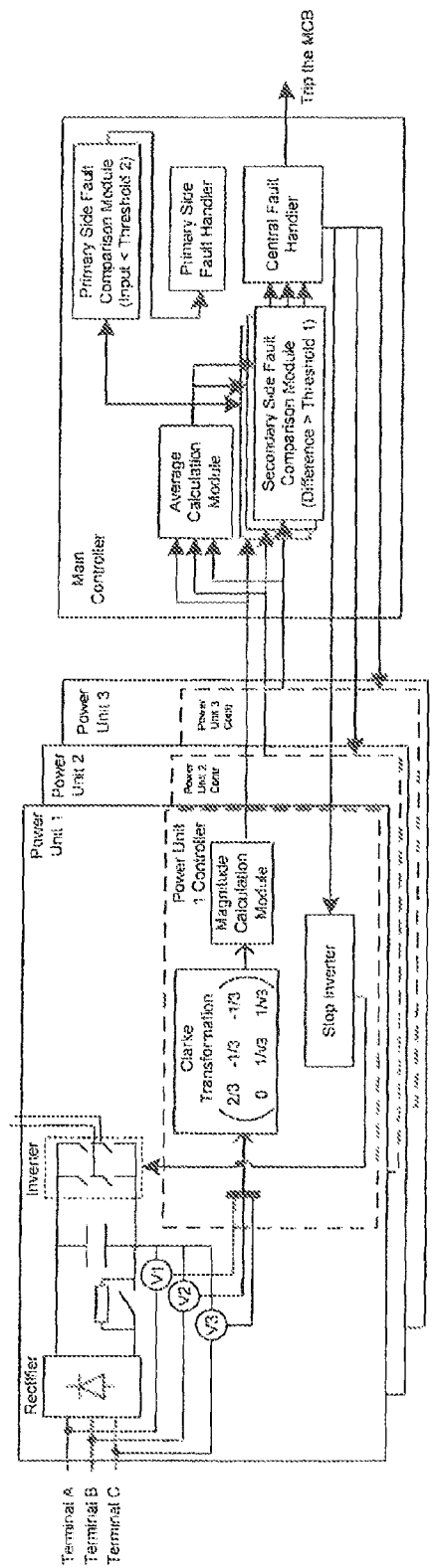
FIG. 4B shows an alternative block diagram for the primary and secondary side fault detection method according to FIG. 4A.

FIG. 4B shows an alternative block diagram for the primary and secondary side fault detection method according to FIG. 4A. The change needed to FIG. 4A is to move the secondary side fault comparison module to the main controller. Below is a sample of source codes for the method above:

```
// Power Unit Controller
    ualpha    = (V1 * 2.0 - (V2 + V3))/3;
    ubeta     = (V2 - V3) * 1 / sqrt(3);
magnitude     = sqrt(ualpha^2+ ubeta^2); // Clarke transformation
    // Mainl Controller
    Magnitude_Average = (Magnitude_PowerUnit1 +
    Magnitude_PowerUnit2 + Magnitude_PowerUnit3)/3;
    if (abs(Magnitude_PowerUnit - Magnitude_Average) > Threshold)
        send(PowerUnit_Input_Failure);
    end
```

Figure 4C:
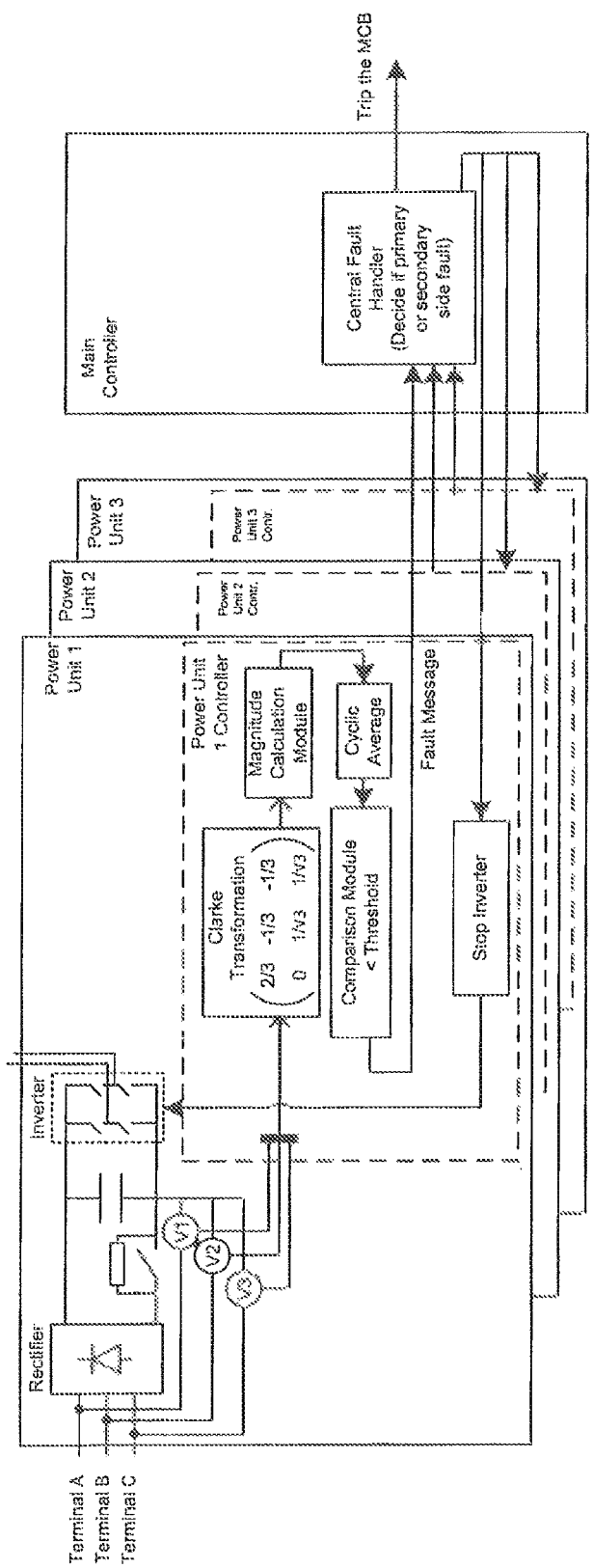
FIG. 4C shows an alternative block diagram for the primary and secondary side fault detection method according to an embodiment of present invention.

FIG. 4C shows an alternative block diagram for the primary and secondary side fault detection method according to an embodiment of present invention. The change needed to FIG. 4C is that the power unit controller can calculate a cyclic average of the magnitude of the vector sum of the phase-to-phase voltages for a power unit, such as power unit 1, power unit 2, and power unit 3, and compare the cyclic average in the comparison module to a threshold, this threshold being 70-90% of the rated secondary voltage of the transformer. If this cyclic average exceeds below the threshold, then the comparison module can judge that there is a fault and sends a fault message to the central fault handler in the main controller. The central fault handler can judge if it is a secondary side fault or a primary side fault by the number of received fault messages. If the number of received fault messages exceeds a level being 30-90% of the number of power units, then it can judge that there is a primary side fault. If the number of received fault messages exceeds below this level being at least 1, then it can judge that there is a secondary side fault.

Figure 4D:
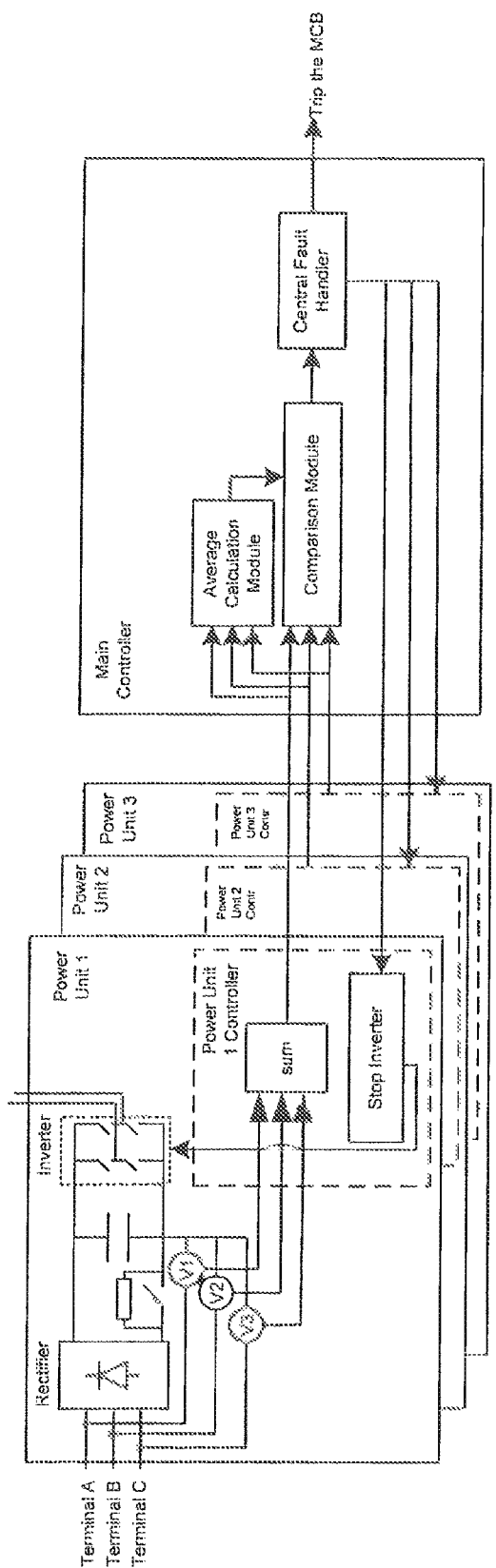
FIG. 4D shows an alternative block diagram for the secondary side fault detection method according to an embodiment of present invention.

FIG. 4D shows an alternative block diagram for the secondary side fault detection method according to an embodiment of present invention. Secondary side faults such as a two phase short circuit in the secondary windings of the transformer, in the cables electrically connecting the transformer and the power unit or inside the rectifier of the power unit can be detected. The change needed to FIG. 4A is that the power unit controller calculates the sum of V1, V2 and V3 and sends it to the main controller. The main controller can calculate an average of the received three values and compares the sum of the measured phase voltages of each power unit and the average and detects a fault based on such a difference. If the level of the difference exceeds a range, being 30-40% of the rated secondary voltage of the transformer, then the main controller can judge there is a secondary side fault and accordingly send a secondary side fault signal to the fault handler module of the main controller which can initiate a trip signal to switch off the main circuit breaker (MCB) to turn off the power supply to the drive and/or provide a secondary side fault signal to the power unit controllers, which can initiate a stop command to stop the operation of the inverter of the power unit.

Figure 4E:
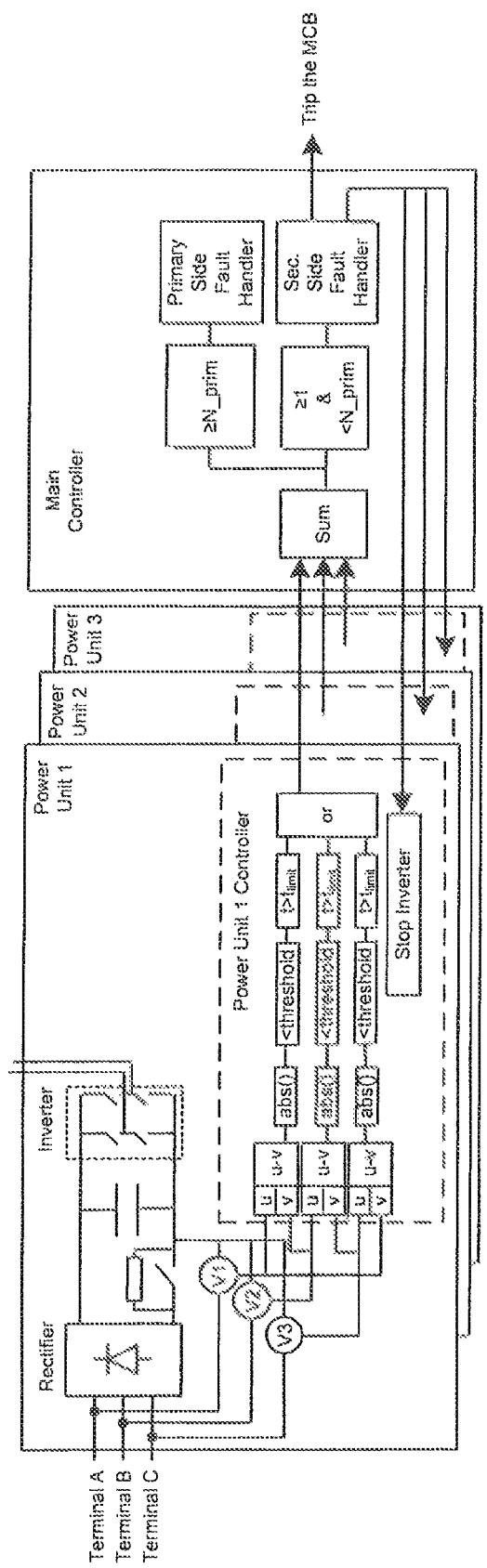
FIG. 4E shows an alternative block diagram for a secondary side fault detection method, according to an embodiment of present invention.

FIG. 4E shows an alternative block diagram for a secondary side fault detection method, according to an embodiment of present invention.

The phase-to-phase voltages between V1 and V2, V2 and V3 and V3 and V1 are calculated. If one of these three phase-to-phase voltages are below a threshold, being 30-40% of the rated secondary voltage of the transformer, for longer than a time $t_{limit}$, being 1-30% of the fundamental period of the grid voltage, this information will be send to the main controller. If this event is received by the main controller from at least one and less than a number N_prim, of power units, being at least 3, then the main controller has detected a secondary side fault, being short circuits in the secondary windings of the transformer, in the cables electrically connecting the transformer and the power units or inside the rectifiers of the power units. If this event is received by the main controller from at least N_prim of power units, then the main controller has detected a primary side fault, being short circuits on the feeder cable of the transformer or between windings on the primary side of the transformer.

Figure 4F:
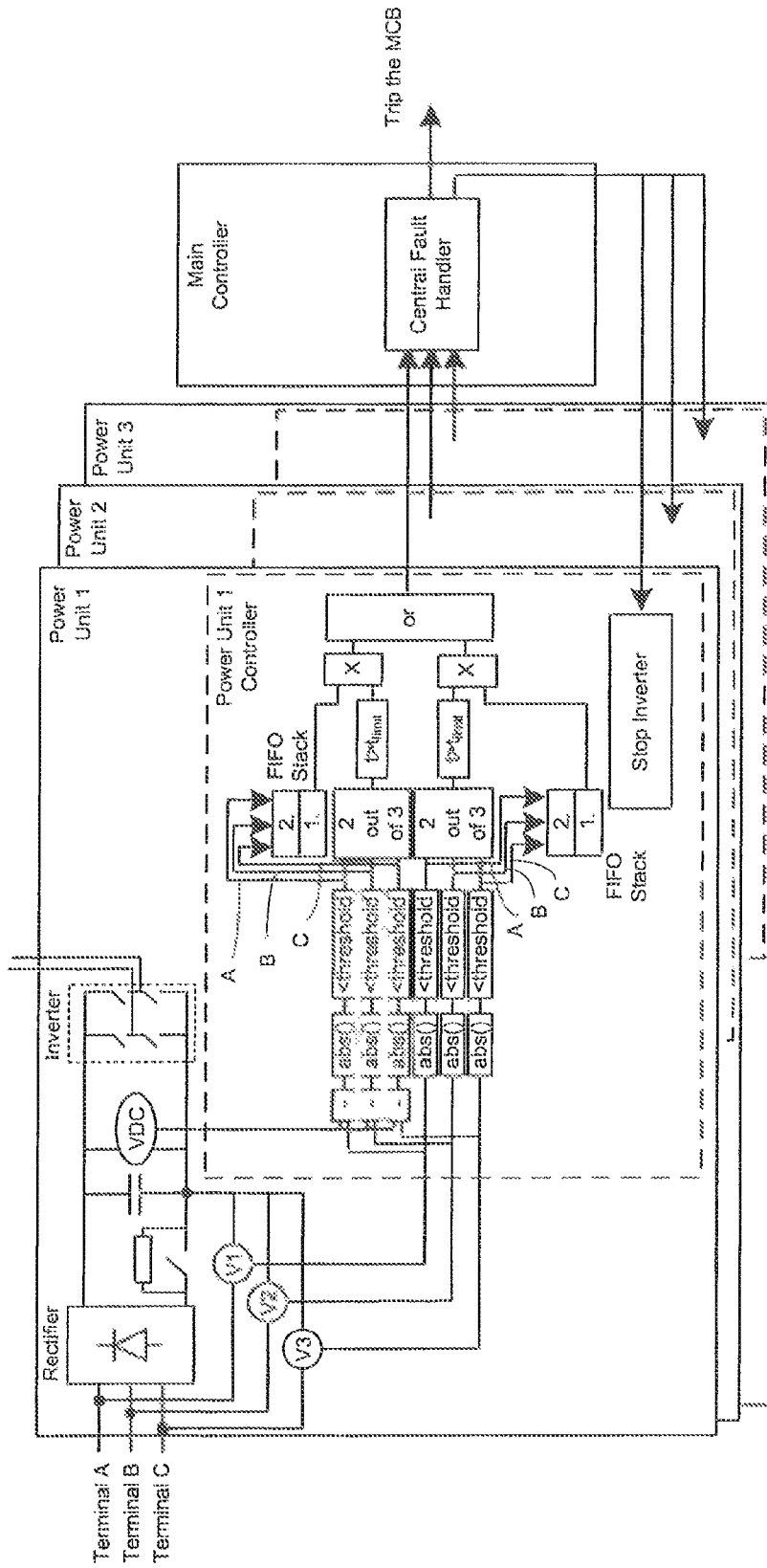
FIG. 4F shows an alternative block diagram for a secondary side fault detection method, with the detection of a diode rectifier diode short circuit fault, according to an embodiment of present invention.

FIG. 4F shows an alternative block diagram for a secondary side fault detection method, with the detection of a diode rectifier diode short circuit fault, according to an embodiment of present invention. VDC is the voltage measured across the DC Link capacitor of the power unit.

The absolute value of the voltages V1, V2, V3, the voltage differences between V1 and VDC, V2 and VDC and V3 and VDC are calculated. Each of these absolute values are compared to a threshold of for example 2-5% of the nominal voltage of VDC. This comparison is true if the voltage is smaller than the threshold. Three results of those comparisons depend on VDC. If 2 out of those three comparisons are true during longer time than limit of for example 5-15% of one third of the input voltage fundamental period, then a diode rectifier diode short circuit fault is detected. If 2 out of those three of the other three comparisons are true during longer time than tlimit, then a diode rectifier diode short circuit fault is detected as well. Additionally it can be detected which diode of the diode rectifier has failed to short circuit. If the comparison is true for the value, which depends on the voltage of Terminal A, then 'A' will be written into the FIFO stack. If the comparison is true for the value, which depends on the voltage of the Terminal B, then 'B' will be written into the FIFO stack. If first 'A' has been written into the FIFO stack and then 'B' has been written into the FIFO stack and no other letter has been written into the FIFO stack and 2 out of 3 comparisons are true, then the diode connected to the Terminal 'A' has been detected to have a short circuit fault. This can be applied for all the different combinations between 'A', 'B' and 'C'. If 2 out of 3 comparisons are true for the values, which are calculated depending on VDC, then the diode short circuit has happened on at least one of the diodes of 20a, 20b or 20c. If 2 out of 3 comparisons are true for the values, which are calculated not depending on VDC, then the diode short circuit has happened on at least one of the diodes of 20d, 20e or 20f If a diode rectifier diode short circuit fault is detected, then a fault message will be sent to the central fault handler and the central fault handler will trip the MCB and stop the inverter.

Figure 4G:
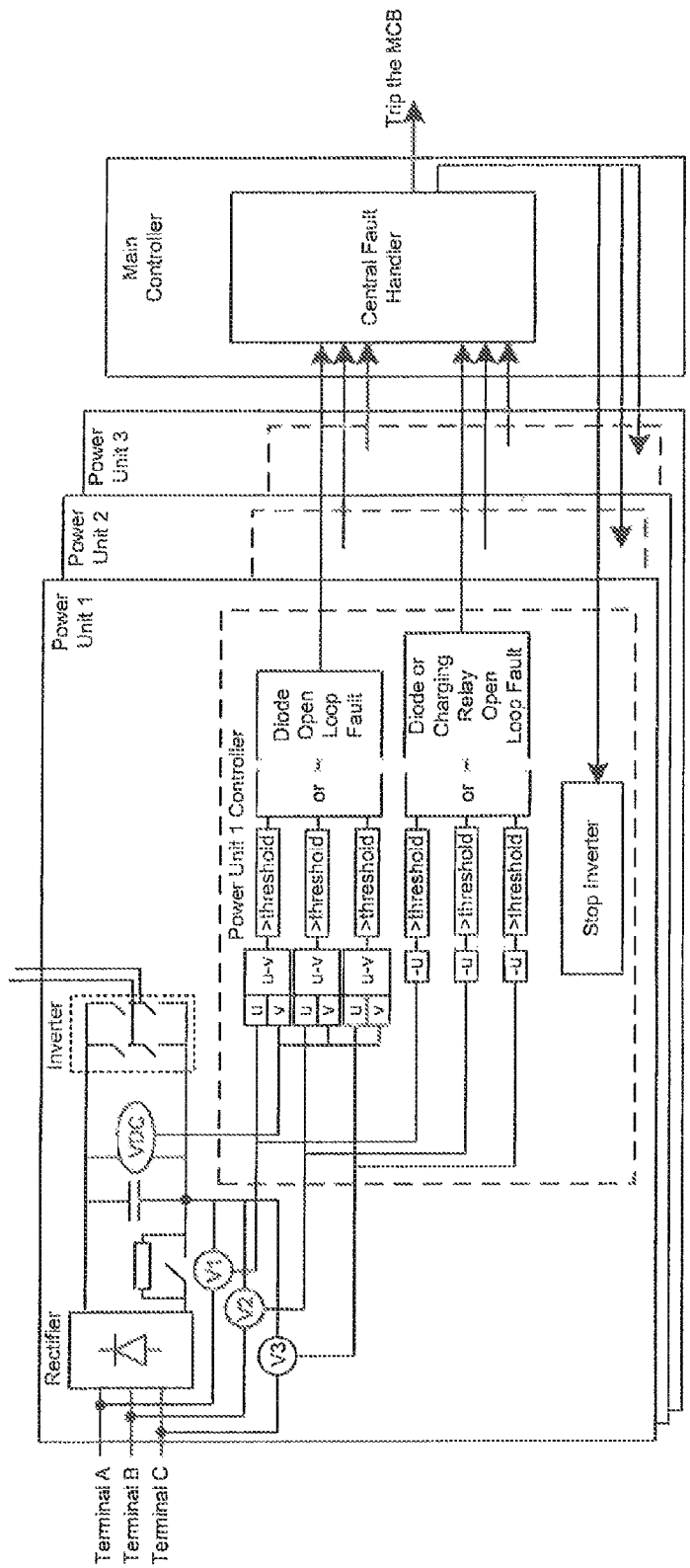
FIG. 4G shows an alternative block diagram for a secondary side fault detection method, with the detection of a diode rectifier diode or charging relay open loop fault, according to an embodiment of present invention.

FIG. 4G shows an alternative block diagram for a secondary side fault detection method, with the detection of a diode rectifier diode or charging relay open loop fault, according to an embodiment of present invention.

The voltage difference between V1 minus VDC, V2 minus VDC and V3 minus VDC are calculated. Each of these three values gets compared to a threshold being for example 2-5% of the nominal voltage of VDC. This comparison is true if any of these voltages is bigger than the threshold. If at least one of these comparisons is true then a diode rectifier diode open loop fault is detected. As well the voltages V1, V2 and V3 are negated. If one of these 3 values exceeds above the threshold, then a fault is detected. This fault can be a diode rectifier diode open loop or a charging relay open loop fault, which in this case cannot be distinguished. If a diode rectifier diode open loop fault or a charging relay open loop fault is detected, then a fault message will be sent to the central fault handler and the central fault handler will trip the MCB and stop the inverter.

Figure 4H:
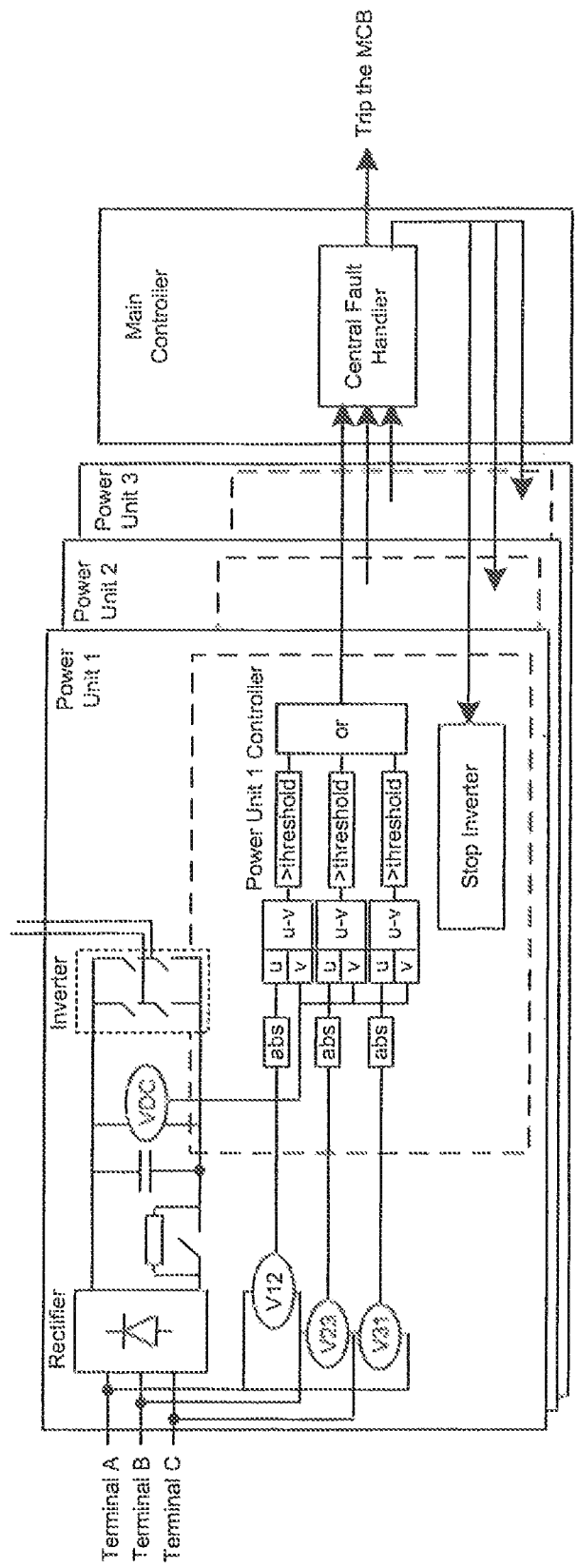
FIG. 4H shows an alternative block diagram for a secondary side fault detection method, with the detection of a diode rectifier diode open or charging relay open loop fault, according to an embodiment of present invention.

FIG. 4H shows an alternative block diagram for a secondary side fault detection method, with the detection of a diode rectifier diode open or charging relay open loop fault, according to an embodiment of present invention.

The phase-to-phase voltages V12 between Terminal A and B, V23 between Terminal B and C and V31 between Terminal C and A are measured. The differences of each of these voltages to VDC are calculated. The absolute value of each of these differences is calculated. If one of these three values exceeds a threshold being for example 2-5% of the nominal voltage of VDC then the power unit controller detects a fault. This fault can be a diode rectifier diode or charging relay open loop fault. In this case these two faults cannot be distinguished. If this fault is detected then the central fault handler will trip the MCB and stop the inverter.

Figure 4I:
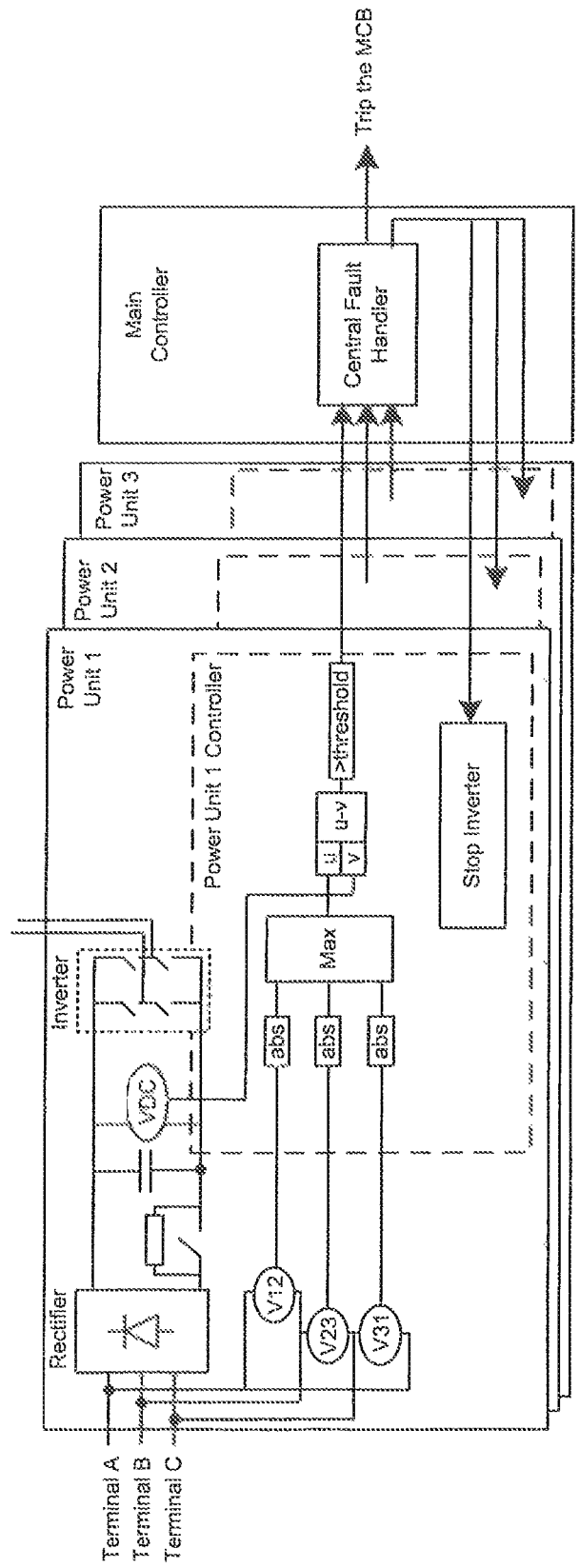
FIG. 4I shows an alternative block diagram for a secondary side fault detection method, with the detection of a diode rectifier diode open or charging relay open loop fault, according to an embodiment of present invention.

FIG. 4I shows an alternative block diagram for a secondary side fault detection method, with the detection of a diode rectifier diode open or charging relay open loop fault, according to an embodiment of present invention.

The phase-to-phase voltages V12, V23 and V31 are measured. The absolute value of each of these voltages is calculated. The maximum value of each of these absolute values is taken and used to calculate the difference of it to the VDC voltage. If this difference exceeds above a threshold being for example 2-5% of the nominal voltage of VDC, then the power unit controller detects a fault. This fault can be a diode rectifier diode or charging relay open loop fault. In this case these two faults cannot be distinguished. If this fault is detected then the central fault handler will trip the MCB and stop the inverter.

Figure 4J:
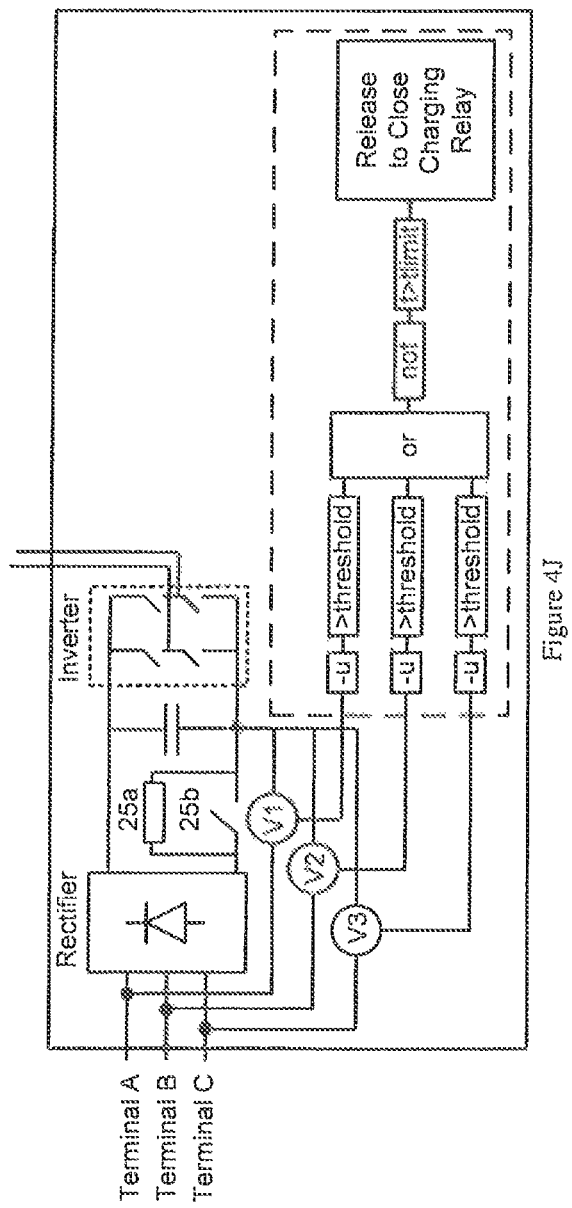
FIG. 4J shows an alternative block diagram for the protection of the charging relay.

FIG. 4J shows an alternative block diagram for the protection of the charging relay.

Each of the measured voltages V1, V2 and V3 are negated. Each of these values is compared to a threshold being for example 2-5% of the nominal voltage of VDC. The output of the 'Or' operator of these three comparisons gets inverted and if this inverted signal is true for a time being for example at least a sixth of the fundamental period of the grid voltage then a release signal to close the charging relay is given.

As an alternative to FIG. 4G to 4J wherein the charging unit 25a, 25b are electrically connected with the DC-minus, it is to be understood that the charging unit can also be electrically connected between the rectifier 20 and the DC-plus. Wherefore the method for charging relay open loop fault detection in 4G and the method for charging relay protection in FIG. 4J would have to be adapted accordingly.

Figure 5:
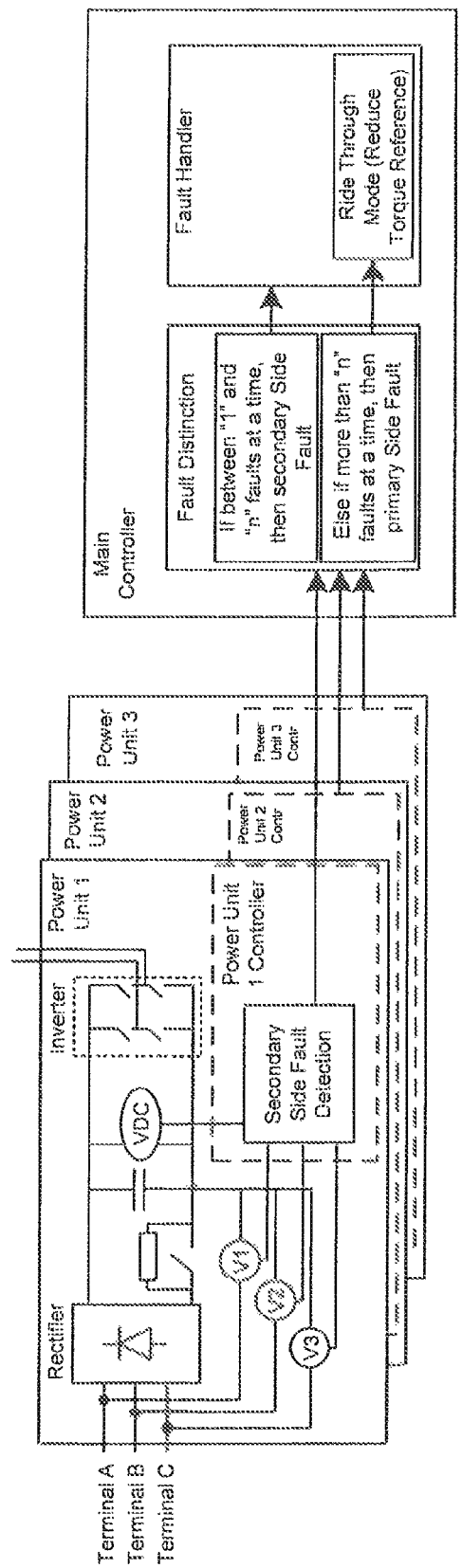
FIG. 5 shows an alternative block diagram for the general distinction between primary side and secondary side fault detection.

FIG. 5 shows an alternative block diagram for the general distinction between primary side and secondary side fault detection.

The power unit controller detects faults on the according power unit and regards it as secondary side faults and sends a corresponding fault message to the main controller. If the main controller receives at least 1 and less or equal than n secondary side fault messages at a time from the power unit controllers, then the main controller regards this fault as a secondary side fault, with n being for example 3. If more than n secondary side faults at a time are received than the main controller regards the fault as a primary side fault and can initiate for example a ride through mode, meaning reducing the torque reference.

The localization of the fault to the power unit is more comprehensive if using a higher number of power units. If using only some of the power units, for example one or more, then the power unit fault detection is restricted on the selected. If we increase the number of the power units to a higher number, then the fault detection scope is extended to such higher number of power units.

Electrical measurement chains typically suffer from a certain amount of disturbance, due to material tolerance and electrical influence from other components locally placed close to the measurement chain. Also the measurement value is not completely smooth to be compared by a static value, i.e. the measurement signal comprises of different frequency components. These influences can be reduced by using a higher number of Power Units and therefore a higher number of measurement signals which then, due to statistics, give in average more accurate information about the actual circumstance which need to be measured. Therefore a higher number of power units result in a higher reliability of this method.

For selection of the fault level, the transformer secondary winding voltage rating, the capacitor bank dimensioning and further disturbances on the measurement chain, such as described in the previous paragraph have to be considered.

By having the embodiment above, it is to be understood that fuses assembled on the power units are not necessary for protection of a secondary side fault; in addition, a secondary side fault due to a short circuit/open circuit of the secondary windings or an open circuit/short circuit of the rectifier of the power unit can be detected and thus protecting the drive from further damage; finally, they are helpful for detecting and protecting a secondary side fault with the power units where the AC load is light.

Due to multiple measurements of voltages at input to the power unit, a sufficient accurate information can be given on the voltage of the transformer primary winding. If only one power unit input voltage would be measured, it could not be distinguished between secondary winding fault or even power unit fault and transformer primary winding fault, such as grid loss.

By having the embodiment as above, the primary side defect can be detected faster than using the measurement on the DC-link of a power unit, so that an appropriate reaction, such as ride through mode can be activated more quickly.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A multi-phase electric drive, including:
   a multi-phase power transformer, including at least one primary winding and a first number of secondary windings, said primary winding being electrically connectable to a source of multi-phase AC power;
   a first number of power units, each of said first number of power units having input connected with a corresponding one of said first number of secondary windings, and a multiple of said first number of power units being serially connected with respective others of said power units in each phase output line connectable to a multi-phase AC load;
   at least one measurement device, being electrically connected with said input to at least one of said first number of power units and being adapted for measuring an electrical quantity at the input thereto; and a control system, being adapted for detecting a fault based on a value for the measured electrical quantity;

wherein said control system is further adapted for detecting said fault based on difference between the value for said electrical quantity measured at the input to at least one of said first number of power units and a threshold; and wherein said value for measured electrical quantity is a cyclic average of said measured electrical quantity.

2. The multi-phase electric drive according to claim 1, including:

at least two said measurement devices, being respectively connected with said inputs to at least two of said first number of power units;

wherein:

said control system is further adapted for detecting said fault based on difference between the values for said electrical quantities measured at said inputs to said at least two power units.

3. The multi-phase electric drive according to claim 2, wherein:

said control system is further adapted for detecting said fault based on the value for the electrical quantity measured at the input to one of said at least two of said first number of power units and an average of the values for said electrical quantities measured at the inputs to said at least two of said first number of power units.

4. The multi-phase electric drive according to claim 3, wherein:

said control system includes a main controller and at least two power unit controllers;

the main controller is adapted for calculating said average; and said at least two power unit controllers are adapted for detecting said fault based on said average and the value for the measured electrical quantity.

5. The multi-phase electric drive according to claim 2, wherein:

said control system is adapted for identifying the fault as a secondary side fault where said difference is beyond a range.

6. The multi-phase electric drive according to claim 5, wherein:

said control system is further adapted for stopping modulation of the power units in response to said secondary side fault detected.

7. The multi-phase electric drive according to claim 6, wherein:

said control system is adapted for shedding said multi-phase AC load torque in response to said primary side fault detected.

8. The multi-phase electric drive according to claim 1, wherein:

said input to said power unit includes a multiple of input terminals for receiving a multiple of phase outputs of the first number of secondary windings; and said at least one measurement device is adapted for measuring an input terminal electrical quantity of said electrical quantity at respective one of said multiple of input terminals.

9. The multi-phase electric drive according to claim 8, wherein:

said input terminal electrical quantity is a phase-to-phase voltage input to said power unit.

10. The multi-phase electric drive according to claim 8, wherein:

said input terminal electrical quantity is a phase voltage input to said power unit.

11. The multi-phase electric drive according to claim 8, wherein:

said control system is further adapted for detecting said fault based on a magnitude of said respective input terminal electrical quantities of said electrical quantity.

12. The multi-phase electric drive according to claim 1, wherein:

said input to said power unit includes at least one input terminal for receiving at least one phase output of at least one of the first number of secondary windings;

said measurement device is adapted for measuring an input terminal electrical quantity of said electrical quantity at said one input terminal.

13. The multi-phase electric drive according to claim 12, wherein:

said input terminal electrical quantity is a phase voltage input to said power unit.

14. The multi-phase electric drive according to claim 1, wherein:

said control system includes a main controller; and the main controller is adapted for detecting said fault based on the value for the measured electrical quantity.

15. The multi-phase electric drive according to claim 14, further including:

a circuit breaker, being adapted for cutting off said source of multi-phase AC power in response to said secondary side fault detected.

16. The multi-phase electric drive according to claim 1, further including:

a current measurement device being magnetically coupled with said primary winding.

17. The multi-phase electric drive according to claim 2, including:

multiple of measurement devices, which are adapted for measuring a multiple of electrical quantities respectively at the inputs of a multiple ones of said first number of power units;

wherein:

said threshold is a predetermined value; and said control system is further adapted for calculating a multiple of differences respectively between the value for the respective one of said multiple of electrical quantities and said threshold.

18. The multi-phase electric drive according to claim 17, wherein:

said control system is adapted for identify the fault as a primary side fault where any of said multiple of differences is beyond a range.

19. A method for operating a multi-phase electric drive, including:

transforming an input voltage to a plurality of secondary voltage sources;

feeding power from said plurality of secondary voltage sources to each phase of a load from a multiple of a first number of power units being serially connected with respective others of said first number of power units in each phase output line;

measuring an electrical quantity at input of at least one of said first number of power units; and detecting a fault based on value for the measured electrical quantity;

wherein said value for the measured electrical quantity is a cyclic average of said electrical quantity.

20. The method for operating the multi-phase electric drive according to claim 19, wherein:
  measuring multiple electrical quantities at inputs to a multiple of said first number of power units;
  said threshold is a predetermined value; and
  detecting said fault based on a multiple of differences respectively between said multiple electrical quantities and said threshold.

21. The method for operating the multi-phase electric drive according to claim 19, wherein:
  said average value is a cyclic average.

22. The method for operating the multi-phase electric drive according to claim 19, wherein:
  detecting said fault based on difference between said value for electrical quantity measured at the input to at least one of said first number of power units and a threshold.

* * * * *